UNITED STATES PATENT OFFICE.

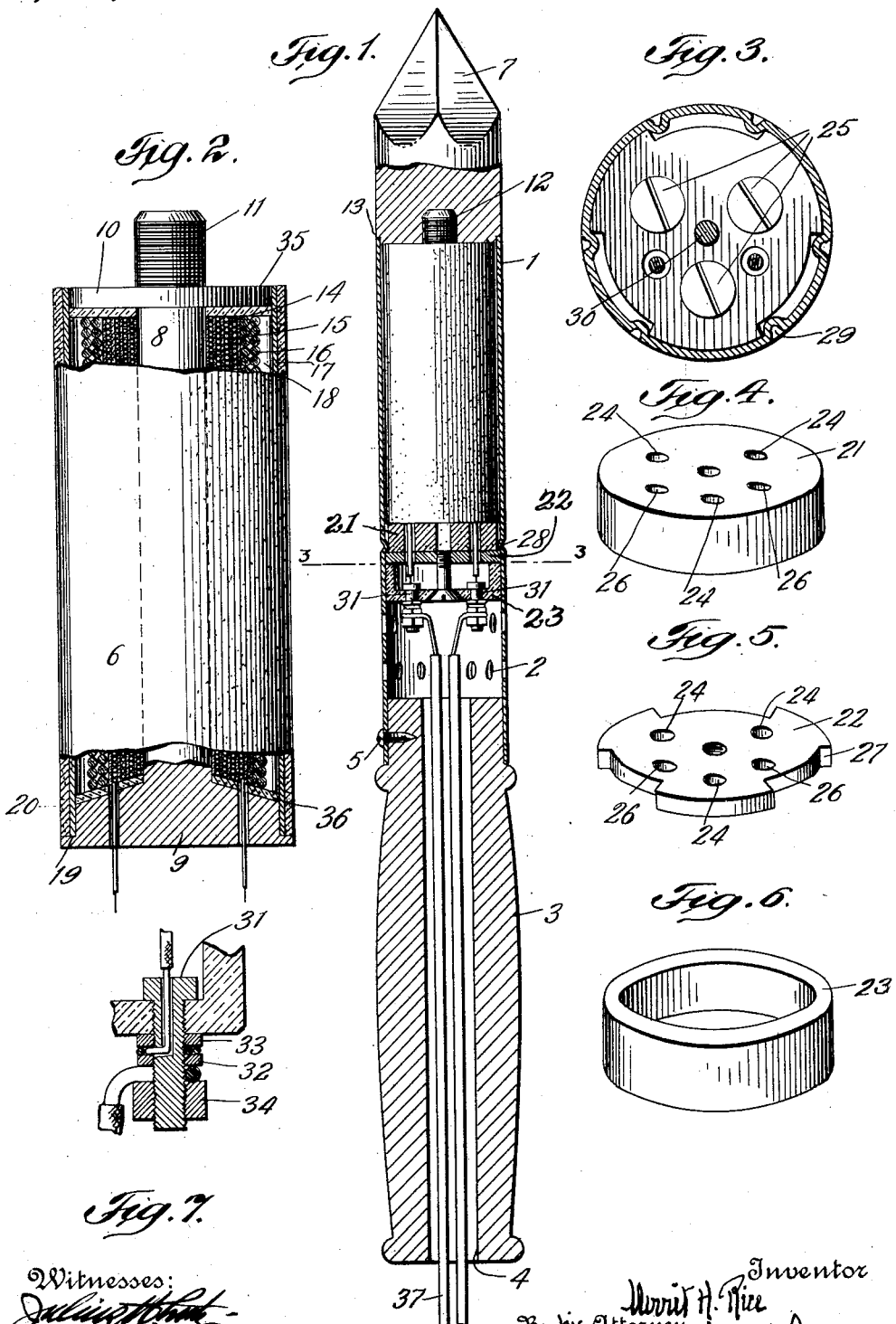

MERRIT H. RICE, OF NEW ROCHELLE, NEW YORK, ASSIGNOR TO NATIONAL ELECTRIC UTILITIES CORPORATION, OF NEW YORK, N. Y., A CORPORATION OF NEW YORK.

ELECTRIC SOLDERING-IRON.

1,079,066. Specification of Letters Patent. Patented Nov. 18, 1913.

Application filed May 1, 1913. Serial No. 764,767.

*To all whom it may concern:*

Be it known that I, MERRIT H. RICE, a citizen of the United States, residing at New Rochelle, in the county of Westchester and State of New York, have invented new and useful Improvements in Electric Soldering-Irons, of which the following is a specification.

This invention relates to soldering irons of the electrical type and has for its objects the provision of an iron which is inexpensive, simple in construction, adaptable to long-continuous service without injury to any of its parts, easily assembled and taken apart, and having its handle and body thoroughly insulated from the heating element.

The invention comprises a containing casing preferably of the same diameter throughout its length and perforated toward the handle end in order that it may act as a radiator for the heat which might be transmitted from the other end, a handle suitably secured to the perforated end of the containing casing, a heating unit comprising a suitable heating element and insulating means, and a soldering tip adapted to secure and locate the heating unit in the containing casing.

More specifically, the invention comprises a containing casing and a heating unit arranged to be properly located in the casing and secured in position by a soldering tip, the said heating unit having at one end means normally projecting beyond the end of the containing casing for the engagement with the soldering tip and having at its other end means for engaging a part of the casing, so that the heating unit may not revolve therein.

In the accompanying drawings showing one form of a specific embodiment of my invention, in the several views of which similar reference characters designate corresponding parts:—Figure 1 is a longitudinal section partly in elevation; Fig. 2 is an enlarged view of the heating unit partly in section and partly in elevation; Fig. 3 is a horizontal section along line 3—3 of Fig. 1, on an enlarged scale; Figs. 4, 5 and 6 are enlarged perspective views of the insulation disk, retaining cap and porcelain insulator respectively; and Fig. 7 is a sectional detail through the porcelain cap.

Referring to the drawings, 1 represents the containing casing, which may be of the same diameter throughout its length, having a series of perforations 2 at or near the handle end. The handle end of the casing is made of the same diameter as the other end in order to obtain as large a radiating surface as possible. The handle 3, of wood or other suitable material, has a longitudinal bore 4 for reception of wires conducting the electricity to the heating element. This handle may be attached to the casing in any manner,—here shown as attached by screws 5. The handle preferably terminates some distance from the heating unit in order that it may not be affected by the heat thereof. The casing contains the heating unit 6, which is arranged to be located in such manner that means on one end of it may project from the end of the casing in order that a soldering tip 7 may be secured thereto. This heating unit comprises a spool or core 8 having upper and lower flanges 9 and 10 and means at its upper end,—here shown as a screw-threaded portion 11, to which the soldering tip is attached. The soldering tip is provided with a screw-threaded socket 12 and a shoulder 13 which engages the end of the containing casing 1. This soldering tip thus, through its attachment to the heating unit, serves to assemble the parts of the iron.

The heating unit 6 consists of a spool holding a suitable heating element, shown as resistance wire 14 insulated from the core 8 by mica 15 and having its different convolutions suitably insulated by sheets of mica. To confine the heat to the heating element and the core, asbestos 16, preferably in the form of cord, is placed around the heating element 14, the shell 17 serving as an envelop, so that there results a compact heating unit which may in itself be sold as an article of manufacture to be inserted in the casing. In order to more effectually prevent over-heating of this heating unit and thus the outside casing 1, I preferably wind the asbestos cord 16 in such manner as to leave a space, designated by 18, between the asbestos and the shell 17. The shell fits over the flanges 9 and 10 and rests against the shoulder 19 on flange 9. Asbestos sheet 20, of about the width equal to the distance the shoulder 19 projects from the flange 9, is provided to further insulate the heating unit from the containing casing 1.

To electrically insulate the casing 1 from the heating element and to make the proper connection between the leading-in wires and the heating element, asbestos disk 21, retaining cap 22 and porcelain cap 23 are provided. The disk 21 and retaining cap 22 are provided with holes 24 for screws 25 attaching them to flange 9 of the heating unit. Holes 26 are provided in the asbestos disk 21 and retaining cap 22 for leading-in wires from the source of electricity. The asbestos disk is held in place by the screws 25 and retaining cap 22, the lugs 27 of the retaining device projecting beyond the periphery of the asbestos disk 21. These lugs serve as stops engaging the wall of a ridge 28 made in the casing 1.

To prevent rotation of the heating unit and to suitably guide the heating unit into the casing 1, such casing is provided with projections 29, which are spaced apart a distance corresponding to the lugs 27 of the retaining cap, as is clearly shown in Fig. 3.

The porcelain cap is attached to the retaining device by central screw 30. It is provided with two bushings 31 through which the wires of the heating element extend. These wires are secured to the bushing between washers 32 and 33. The wires 37 may be passed through the bore 4 of the handle and temporarily connected to the bushing 31 through means of washer 32 and nut 34. The screws serving to hold the retaining cap 22 in place do not extend through the porcelain cap 23, but a single screw 30 serves to connect this porcelain cap to the retaining cap. Therefore, there is no way in which the device may become short-circuited.

In assembling the soldering iron, the shell 17 is placed in the casing 1 and is guided into place by means of the lugs 27 of the retaining device and the projections 29 of the casing. The under edges of the lugs 27 engage the upper wall of the ridge 28 and prevent the heating unit sliding all the way through the casing 1. The threaded end 11 of the spool projecting beyond the end of the casing serves for the attaching of the soldering tip 7 and this tip, having its end or shoulder 13 engaging the casing, alone serves to secure the heating unit in position. Through this arrangement there is provided a large area of contact between the soldering tip and the heating unit and these parts are suitably insulated through the mica disk 35, which allows the heat to be conducted to the tip. Mica disk 36 may also be provided at the other end to electrically insulate the heating unit from the flange 9 of the spool.

The iron manufactured in accordance with the invention may be used continuously for a long period of time without over-heating and without injury to any of its parts. The several parts may be inexpensively manufactured and the iron may be easily and quickly assembled. If for any reason it is desirable to replace the heating unit this may be done without injury to and loss of the handle and casing, the heating unit being so arranged as to be constructed as a complete article of manufacture.

What I claim is:—

1. A soldering iron comprising a casing having a heating unit locating means near one end, a handle with wires passing through it attached direct to said end, a heating unit located near the other end, and a tip engaging said heating unit and casing and coöperating with said locating means for securing the heating unit in position.

2. In a soldering iron, a casing having an internal projection, a heating unit therein comprising a spool having solder tip engaging means, and a soldering tip engaging said means and the casing and coöperating with said projection for securing the heating unit in position.

3. In a soldering iron, a heating unit comprising a shell and a contained heating element insulated therefrom, perforated heat insulating material attached at one end of said shell, a perforated retaining member therefor, and an insulating cap attached to said retaining member and provided with holes for passage of wires of said heating element.

4. In a soldering iron the combination of a casing having a heating unit locating means and a handle attached at one end, of a heating unit in said casing near the other end having means for engagement with a soldering tip, and a soldering tip engaging said means and the casing and coöperating with said locating means to secure the heating unit in place.

5. In a soldering iron the combination with a casing having means for locating a heating unit, of a heating unit provided with soldering tip engaging means at one end and with means at the other end coöperating with the locating means of the casing whereby it may be guided into position and be held against rotation, and a soldering tip attached to said tip engaging means and engaging said casing.

6. In a soldering iron, a heating unit comprising a heating element, suitable insulation therefor and a containing shell, electric insulation at one end of said shell having holes for passage of the wire of the heating element, a retaining cap for said electric insulation having holes for said wire, and an additional insulator attached to said retaining cap having means for connecting said wire to an outside source of electricity.

7. In a soldering iron the combination with a casing having heating unit guiding and retaining means, of a heating unit provided with means arranged to engage the retaining means of said casing to prevent rotation therein and to be guided by said guiding means.

8. In a soldering iron the combination with a casing having heating unit guiding and retaining means, of a heating unit provided with means arranged to engage the retaining means of said casing and to be guided by said guiding means, and a soldering tip arranged for attachment to said heating unit and for engagement with said casing to secure the means of the heating unit in contact with said retaining means.

9. In a soldering iron a casing, an attached handle, a heating unit, and a soldering tip, the casing being provided with a stop to assist in holding the unit in position and with guides for guiding said unit and for preventing rotation thereof in said casing, the unit being provided with spaced lugs adapted to engage said stop of said casing and to co-act with said guides and also having means for attachment of the soldering tip, and the soldering tip being provided with means for engaging the casing and the said means of the unit for securing the unit in said casing.

In testimony whereof, I have hereunto set my hand in presence of witnesses.

MERRIT H. RICE.

Witnesses:
 E. C. VAN GLAHN,
 A. GRIMBERG.

---

Copies of this patent may be obtained for five cents each, by addressing the "Commissioner of Patents, Washington, D. C."